(12) United States Patent
Demin et al.

(10) Patent No.: US 8,211,349 B2
(45) Date of Patent: Jul. 3, 2012

(54) MACHINE FOR INJECTING A HEAT CURABLE MATERIAL, IN PARTICULAR FOR RUBBER VULCANISATION, AND CORRESPONDING METHOD FOR ACHIEVING SAME

(75) Inventors: Stephane Demin, Panossas (FR); Christophe Nogha, Bron (FR)

(73) Assignee: REP International, Corbas (FR)

( * ) Notice: Subject to any disclaimer, the term of this patent is extended or adjusted under 35 U.S.C. 154(b) by 0 days.

(21) Appl. No.: 12/733,794

(22) PCT Filed: Sep. 18, 2008

(86) PCT No.: PCT/FR2008/051676
§ 371 (c)(1),
(2), (4) Date: Jun. 9, 2010

(87) PCT Pub. No.: WO2009/047454
PCT Pub. Date: Apr. 16, 2009

(65) Prior Publication Data
US 2011/0001267 A1     Jan. 6, 2011

(30) Foreign Application Priority Data
Sep. 21, 2007   (FR) ..................................... 07 57746

(51) Int. Cl.
*B29C 45/18*    (2006.01)
*B29C 45/27*    (2006.01)
(52) U.S. Cl. .................. 264/328.12; 425/543

(58) Field of Classification Search ............... 264/327, 264/328.12; 425/542, 543
See application file for complete search history.

(56) References Cited

U.S. PATENT DOCUMENTS

| 3,128,794 A * | 4/1964 | Boucher et al. ................. 138/37 |
| 3,682,443 A * | 8/1972 | Upmeier ....................... 366/336 |
| 3,719,351 A * | 3/1973 | Upmeier ........................ 366/82 |
| 4,199,315 A | 4/1980 | Gallizia |
| 4,363,552 A * | 12/1982 | Considine ..................... 366/340 |
| 4,541,982 A * | 9/1985 | Upmeier ....................... 264/349 |
| 2004/0114461 A1 | 6/2004 | Fuglister |

FOREIGN PATENT DOCUMENTS

| DE | 1926488 | 12/1970 |
| DE | 1954242 | 5/1971 |
| EP | 1186339 | 3/2002 |
| JP | 55 093437 | 7/1980 |
| JP | 10 100198 | 4/1998 |
| JP | 2005 014311 | 1/2005 |

OTHER PUBLICATIONS

Fischer, Jerry M., Handbook of Molded Part Shrinkage and Warpage, 2003, Plastic Design Library, pp. 63-70.*

* cited by examiner

*Primary Examiner* — Jill Heitbrink
(74) *Attorney, Agent, or Firm* — Dowell & Dowell, PC

(57) ABSTRACT

An injection molding machine includes means for plasticizing rubber material and injectors for injecting the material in a fluid state into a flow channel having at least one outlet in communication with an internal volume of a mold. The flow channel is provided with at least one inverter device for inverting a radial temperature profile in the flow of the fluid material, between upstream and downstream ends of the at least one inverter device.

12 Claims, 4 Drawing Sheets

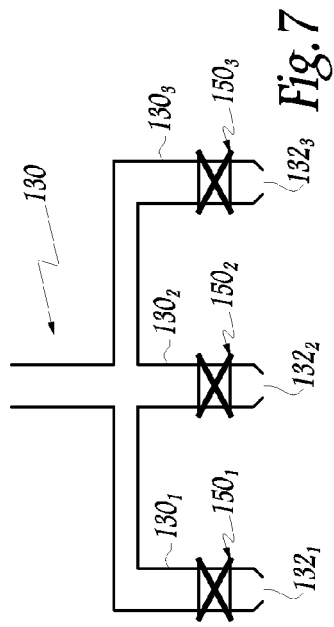
*Fig.6A*
*Fig.6B*
*Fig.6C*
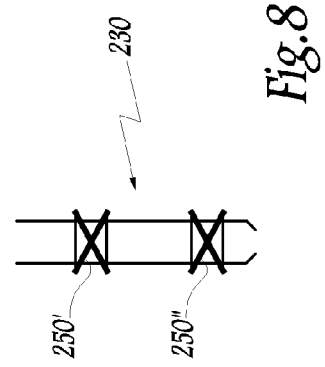
*Fig.7*
*Fig.8*

MACHINE FOR INJECTING A HEAT CURABLE MATERIAL, IN PARTICULAR FOR RUBBER VULCANISATION, AND CORRESPONDING METHOD FOR ACHIEVING SAME

BACKGROUND OF THE INVENTION

1. Field of the Invention

The present invention relates to an injection-molding machine for injection-molding a thermosetting material, and to a method of working such a machine.

More particularly, the invention relates to vulcanization of rubber. However, it can also be used in similar technical fields, such as, in particular, injection-molding or shaping silicones, phenolic resins, or indeed polyurethane resins.

2. Description of the Related Art

Conventionally, a rubber vulcanization machine firstly includes means for plasticizing and injecting the thermosetting material. The state of the art provides various alternatives, as regards the structure of such means.

Thus, a first solution uses separate plasticizing means that include a conveyor screw that heats the material. Such plasticizing means are associated with distinct injection means that comprise, in particular, a piston associated with a chamber for receiving the material that has been made malleable.

By way of a variant, the plasticizing means can be combined with the injection means. In which case, injection is of the "screw-piston" type, in which the plasticizing screw also acts as an injection piston.

Finally, another alternative is of the First-In-First-Out (FIFO) type. In that alternative, the plasticizing takes place though the injection piston.

After the initial plasticizing and injection stage, implemented using one of the above-described possibilities, the malleable material is injected into a flow channel whose downstream end defines at least one outlet orifice. Said outlet orifice opens out into feed channels for feeding a mold, which channels are themselves in communication with the cavities of the mold.

Thus, in the flow channel, which is situated upstream from the mold, the malleable material substantially does not set in service, due to the operating conditions such as, in particular, temperature and flow speed. However, in the bottom volume of the mold, namely in the feed channels and in the cavities, the malleable material does set, due to the temperature and to the stagnation to which it is subjected. Indeed, the outlet orifice of the flow channel has a small cross-section, making it possible to separate the fraction of the material that has set from the fraction of said material that has not, after such setting has taken place.

A common problem when manufacturing products made of rubber lies in the vulcanization time, it being desirable to reduce this time to as short as possible. That problem is broached, for example, in U.S. Pat. No. 6,280,175.

That document teaches providing a constriction in the flow channel, i.e. in a zone in which the malleable material does not set, the cross-section of that constriction not being circular, but rather being generally elongate in the manner of an ellipse. In that way, the rubber is heated uniformly, at all points of its cross-section. In other words, the presence of that constriction makes it possible to bring a substantial quantity of heat to the central stream of rubber, thereby making it possible to reduce the corresponding vulcanization time.

Unfortunately, the solution described in that U.S. Pat. No. 6,280,175 suffers from other drawbacks. It is accompanied by heating that can be excessive and generally non-uniform and that can locally degrade the material, and therefore give rise to defects in the finished piece.

Alternative solutions are also known, in which devices are used to modify the direction of flow of the malleable material. However, unlike in the teaching of the above-mentioned US patent, those devices are placed in the mold proper, i.e. in a zone in which the malleable material sets.

More precisely, EP-A-1 186 339 describes a static mixer designed to homogenize the malleable material. The use of that device gives rise to an increase in the temperature of each fluid stream, thereby giving rise to problems analogous to those encountered when implementing the above-described US patent.

In addition, U.S. Pat. No. 4,199,315 discloses a pneumatic tire injection-molding machine in which, inside the mold, the malleable material is firstly separated into two branch streams. Upstream from the branching point, a cold central stream and a warmer peripheral stream are to be found. Then, within each branch flow, a cold stream and a hot stream are to be found that flow substantially symmetrically about the longitudinal axis of each branch channel.

That document then teaches processing each branch flow by changing the flow paths of the respective hot and cold streams. That solution cannot apply to a flow that is not subdivided, in which the cold central stream is surrounded by a peripheral hot stream. In addition, it is advantageous in very specific uses only, such as injection molding of pneumatic tires.

SUMMARY OF THE INVENTION

That said, an object of the invention is to propose a machine that makes it possible to remedy those drawbacks.

To this end, the invention provides an injection-molding machine for injection-molding a settable material according to accompanying claim 1.

The invention also provides a method of working the above machine according to accompanying claim 10.

BRIEF DESCRIPTION OF THE DRAWINGS

The invention is described below with reference to the accompanying drawings which are given merely by way of non-limiting example, and in which:

FIGS. 6A, 6B, and 6C are diagrammatic views showing the quantities of heat brought to the rubber, in respective ones of two prior art solutions, and in the solution of the invention; and FIGS. 7 and 8 are longitudinal section views analogous to the FIG. 3 view, and showing two variant embodiments of the invention.

DESCRIPTION OF THE PREFERRED EMBODIMENT

Figure 1:
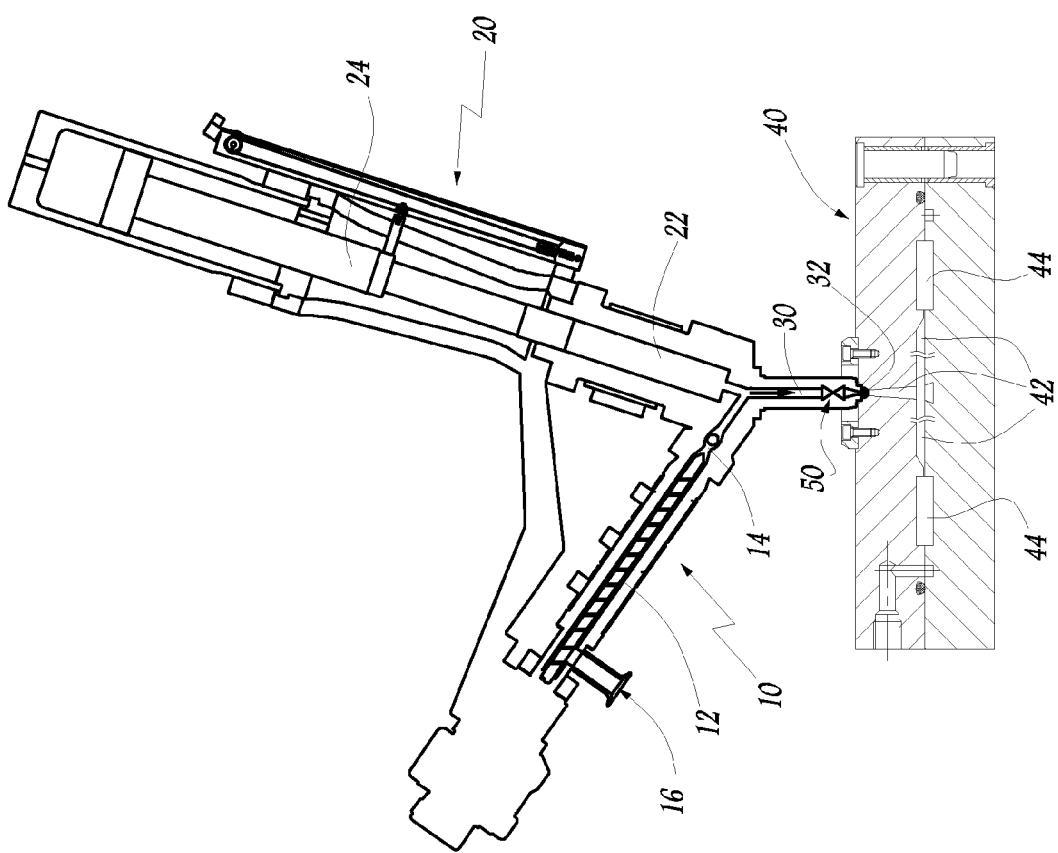
FIG. 1 is a longitudinal section view of a rubber vulcanization machine of the invention.

As shown in FIG. 1, the rubber vulcanization machine of the invention firstly includes plasticizing and injection means, of a type known per se. Firstly, plasticizing means 10 are provided that comprise a screw 12 received in a channel 14 and associated with heater means (not shown). In addition, said screw 12 is associated with an inlet orifice 16 via which the material is inserted into the channel 14, for the purpose of conveying malleable rubber towards the downstream portion of the machine.

Injection means 20 are also provided, also of conventional type, which means comprise a chamber 22 suitable for being filled with fluid rubber from the plasticizing channel 14. Said chamber 22 receives a piston 24 that injects the fluid rubber towards a flow channel 30 that is also of conventional type.

In the example shown, plasticizer means 10 are to be found that are distinct from the injection means 20. However, the invention is also applicable to plasticizing and injection means, such as those described in the introduction of the present description. Thus, by way of an alternative, it is possible to use "screw-piston" injection, or indeed "FIFO" injection.

The channel 30 has an outlet orifice 32 that is put into communication with the inlet of a mold 40 (which is not the subject of the present invention). In a manner known per se, the mold 40 is provided with various feed channels 42 that open out into cavities 44.

As is usual, it is possible to distinguish between two zones, namely firstly the flow channel 30 and secondly the inside volume of the mold that is formed by the feed channels 42 and by the cavities 44. Thus, in the flow channel 30, the rubber substantially does not set in service, in particular due to its temperature and to its speed of flow. Conversely, in the channels 42 and in the cavities 44, it is intended for the rubber to set at the end of the vulcanization operation, in particular because it is subjected to stagnation at the temperature of the mold.

Immediately upstream from the outlet orifice 32, i.e. in a zone in which, as explained above, the rubber does not set, a device of the invention is provided, which device makes it possible to invert the radial temperature field of the rubber in the flow channel 30. In the description below and for reasons of clarity, this device, which is designated overall by reference 50, is referred to as the "inverter device".

Figure 2C:
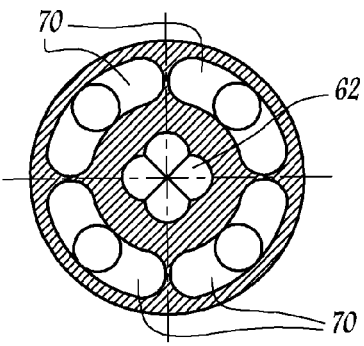
FIGS. 2A, 2B, and 2C are larger-scale views respectively in longitudinal section, from above, and from below, showing the inverter device of the invention for inverting the radial temperature field.
Figure 2A:
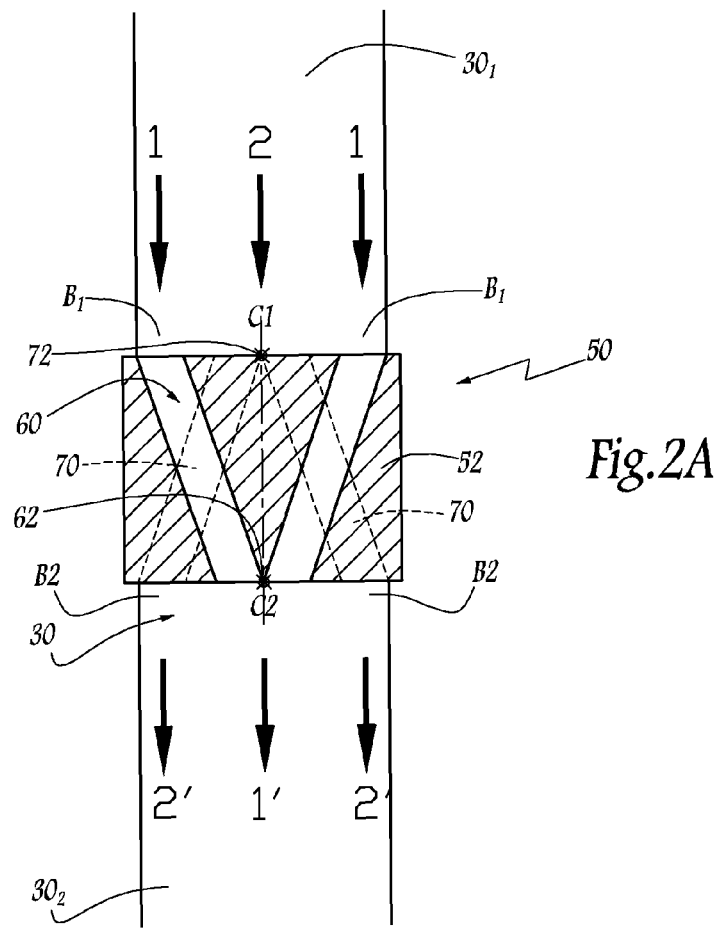
Figure 2B:
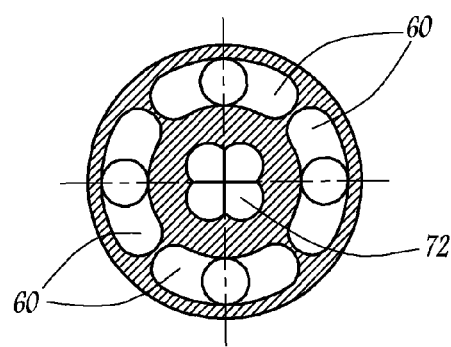

With reference more specifically to FIGS. 2A to 2C, said device 50 comprises firstly a solid body 52, made, for example, of steel, which is secured to the walls of the of the flow channel 30 by any suitable means, in particular by being incorporated in a bore of said channel and being held stationary by a screw-on nozzle. The body 52 is cylindrical, while being coaxial with the flow channel 30. It is provided with various channels, namely four convergent channels 60 and four divergent channels 70, the terms "convergent" and "divergent" being used with reference to the direction of flow of the material, namely downwards in FIGS. 1 and 2A.

With reference to FIG. 2A, the convergent channels 50 are placed facing, upstream, the peripheral edges B1 of the upstream zone $30_1$ of the flow channel. In addition, said channels 60 meet at the downstream ends, so as to form a single outlet opening 62, which opening opens out facing the center C2 of the downstream zone $30_2$ of the flow channel 30.

The divergent channels 70 extend from an opening 72, which opening communicates with the centre C1 of the upstream zone $30_1$ of the flow channel 30. Then, the channels 70 extend away from one another, so as to open out facing the edges B2 of the downstream zone $30_2$ of the flow channel 30.

In FIG. 2A, references 1 and 2 designate the fluid rubber streams flowing, upstream from the device, respectively in the vicinity of the edges B1 and in the vicinity of the center C1 of said channel. In view of the presence of the channels 60 and 70, the peripheral upstream stream 1 forms the central downstream stream 1', while the central upstream stream 2 forms the peripheral downstream stream 2'.

The number, the configuration, and the geometrical shapes of the various channels 60 and 70 are such that they make it possible to transfer the flows of fluid satisfactorily. In addition, it is advantageous for the channels 60 and 70 to occupy a substantial portion of the cross-section of the channel, in order to avoid excessive heating. If the channels are too narrow, overheating occurs as it does when implementing abovementioned U.S. Pat. No. 6,280,175.

Advantageously, at any point of the inverter device, the sum of the cross-sectional areas of the various channels 60 and 70 is greater than 30% of the total cross-sectional area of the flow channel 30, and preferably greater than 50% of said total cross-sectional area. Thus, in the example shown, the eight channels, respectively divergent and convergent, occupy about 55% of the cross-sectional area of the channel.

Figure 3:
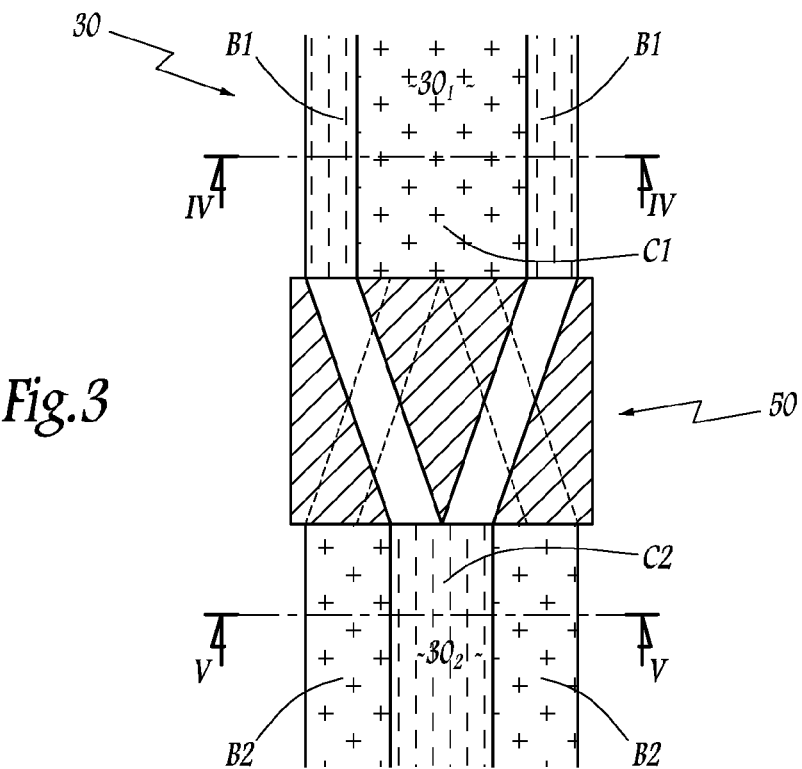
FIG. 3 is a longitudinal section view showing the radial distribution of temperature, respectively upstream from and downstream from said inverter device.

FIG. 3 shows how the inverter device 50 is implemented as regards the radial temperature profile of the rubber, respectively downstream and upstream of said device 50. It is known that, in the main channel 30, the flow of the material is flow of the laminar type. Therefore, the speed of said flow has a value of zero at the edges B1, and has a maximum value at the center C1.

Under these conditions, the temperature of the rubber present at the edge B1 of said channel 30 is much higher than the temperature of the rubber in the vicinity of the center C1, immediately upstream from the device 50. This is shown by the various types of hatching in FIG. 3, and by the radial temperature profile of FIG. 4, corresponding to line IV-IV of FIG. 3.

Figure 4:
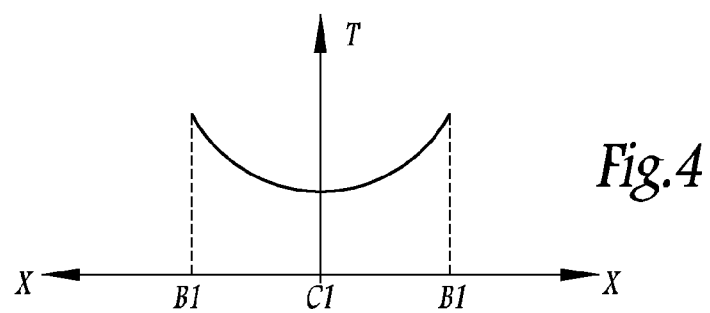
FIGS. 4 and 5 are graphs showing how temperature varies as a function of radial position, at lines IV-IV and V-V of FIG. 3.

In FIG. 4, temperature T is plotted up the ordinate, and radial position X-X is plotted along the abscissa. In other words, the center C1 corresponds to zero on the abscissa, while the edges B1 correspond to a maximum absolute abscissa value. As shown in FIG. 4, the radial temperature profile increases, from the centre C1, in generally symmetrical manner, towards the edges B1.

Downstream from the device 50, in view of the presence of the inverter channels 60 and 70, the central stream 1' is hot, because it corresponds to the hot peripheral stream 1 of the upstream portion. In addition, downstream, the peripheral stream 2' is cold, since it corresponds to the central upstream stream 2. This temperature inversion is shown by the downstream hatching being inverted relative to the upstream hatching.

Figure 5:
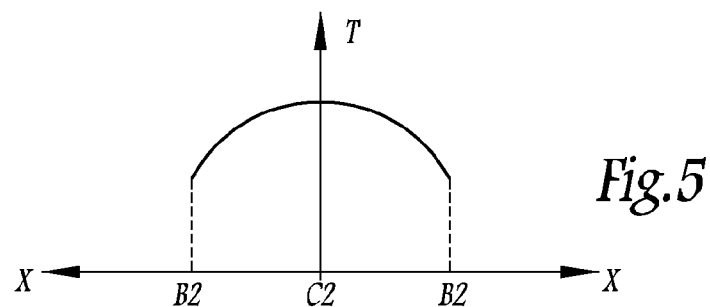

This inversion is also shown in FIG. 5 which corresponds to the radial temperature profile along the line V-V of FIG. 3. Thus, the temperature decreases from a maximum value at the center C2 to a minimum value at the edges B2.

As appears from the above, the device 50 thus inverts the radial temperature field of the rubber. In other words, upstream from said device, the closer a point is to the edge B1, the higher the temperature of the rubber is at that point. Conversely, downstream, the closer a point is to the edge B2, the lower the temperature of the rubber is at that point.

The central and peripheral downstream streams 1' and 2' then flow towards the outlet orifice 32, and then through the channels 42 to the cavities 44 of the mold 40. On this path, subsequent to passing through the inverter device 50, the rubber receives an additional quantity of heat.

As explained above, the peripheral stream 2' receives a quantity of heat that is larger than the quantity of heat delivered to the central stream 1'. Since the peripheral stream 2' is colder, immediately after exiting from the inverter device 50, the quantities of heat brought to any point of the rubber tend to become equalized, when the material is admitted into the cavities 44.

In other words, by adjusting the shape and the positioning of the inverter device 50, it is possible to control the profile of the radial temperature field of the rubber, when said rubber reaches the cavities. It is possible, in particular, to make the radial temperature field substantially uniform when the rubber reaches the cavities, i.e. to make provision for the rubber to have a temperature that remains substantially identical across a given cross-section.

FIGS. 6A, 6B, and 6C show the quantities of heat delivered respectively to the central stream and to the peripheral stream from the time at which they are injected into the flow channel to the time at which they admitted into the cavities 44. FIG. 6A relates to a common example of the state of the art, FIG. 6B relates to the teaching of U.S. Pat. No. 6,280,175, and FIG. 6C shows the solution of the invention.

In the prior art of FIG. 6A, the peripheral stream is continuously heated to a greater extent than the central stream, due to the existence of laminar flow. Under those conditions, the overall quantity of heat Q brought to said peripheral stream is very considerably greater than the quantity Q' brought to the central stream.

In the prior art illustrated by U.S. Pat. 6,280,175, it is possible to distinguish between three main zones in which heat is brought. Firstly, there is the upstream portion, situated before the constriction that is the subject of the invention of that US patent. Then there is the constriction zone proper, and finally there is the region extending downstream from that constriction.

In the upstream zone, the flow is laminar, so that the quantity of heat Q1 brought to the peripheral stream is very considerably greater than the quantity Q'1 brought to the central vein. Then, at the constriction, a substantially uniform heat contribution can be observed, corresponding to values Q2 and Q'2 that are substantially equal. Finally, downstream from the constriction, the flow becomes laminar again, so that the quantity of heat Q3 delivered to the peripheral stream is considerably greater than the quantity Q'3 delivered to the central stream.

Under these conditions, as shown in FIG. 6B, the total quantity of heat QT brought to the peripheral stream is equal to the sum of the quantities Q1, Q2, and Q3. QT is considerably greater than the total quantity Q'T of heat brought to the central stream, which corresponds to the sum of Q'1, Q'2, and Q'3, in spite of the presence of the constriction.

FIG. 6C shows the radial temperature distribution procured in accordance with the invention. In this figure, the middle zone relates to the final central stream 1', i.e. the central stream flowing downstream from the device 50, which stream, as explained above, corresponds to the peripheral upstream stream 1. Likewise, the side portions of FIG. 6C correspond to the final peripheral stream 2' coming from the initial central stream 2.

The total quantity of heat QT delivered to the final peripheral stream 2' corresponds to the sum firstly of the quantity of heat Q'I brought to the initial central stream 2 upstream from the device 50, and secondly, of the quantity of heat QII delivered to said peripheral stream 2' downstream from the device. Due to the laminar flow, Q'I is relatively small, whereas QII is considerably larger.

In analogous manner, the total quantity of heat Q'T brought to the final central stream 1' corresponds to the sum firstly of the quantity of heat QI brought to the initial peripheral stream 1 upstream from the device, and secondly of the quantity of heat Q'II brought to said central stream 1' downstream from the device. For the same reasons as mentioned above, QI is considerably greater than Q'I, whereas Q'II is considerably less than QII. Therefore, as shown in FIG. 6C, the quantities of heat QT and Q'T brought to these two streams tend to become equalized, by means of the inversion procured by the device 50.

The invention makes it possible to achieve the above-mentioned objects.

As appears from the above, all of the zones of the flow of rubber have received a substantial quantity of heat by the time they enter the cavities 44. In other words, the temperature of the rubber at any point is relatively high, thereby making it possible to guarantee a relatively short vulcanization time.

In addition, as shown, in particular in FIG. 6C, a high degree of uniformity exists between the various quantities of heat brought to the various points of the cross-section of the rubber, immediately before said rubber enters the mold cavities. In other words, no zone of rubber exists that has received a particularly large quantity of heat, thereby making it possible to avoid any overheating. Under these conditions, the invention makes it possible to avoid having certain zones of material vulcanize too rapidly.

It should be noted that the Applicant has the merit of having identified the problem related to the teaching of U.S. Pat. No. 6,280,175. In that document, the presence of a constriction guarantees that a relatively high temperature is obtained for the rubber, even in the central portion thereof, which is favorable to vulcanization time. Unfortunately, that solution suffers from the drawback of also delivering a quantity of heat that is particularly high to the peripheral stream of rubber. That gives rise to the above-mentioned problems, namely overheating, vulcanization that is too fast, and degradation of the material.

FIG. 7 shows a first variant embodiment of the invention that uses a flow channel 130 of the regulated-channel block type. Conventionally, this flow channel 130 subdivides, in its downstream portion, into a plurality of branch channels, there being three such branch channels in this example, namely 130₁, 130₂, and 130₃. Each branch channel finds itself associated with a corresponding outlet 132₁, 132₂, and 132₃, which outlets are put into communication with the cavities of three molds (not shown).

In this situation, three inverter devices 150₁, 150₂, and 150₃ are provided immediately upstream from respective ones of the outlets. In this way, the radial temperature field of the rubber is inverted, downstream from each of the devices. This makes it possible for the flow of heat brought to each of the branch flows of rubber to be distributed uniformly, which flows of rubber are flowing towards the cavities (not shown) in the molds downstream.

FIG. 8 shows an additional variant embodiment of the invention, in which the flow channel 230 is equipped with two inverter devices 250' and 250", each of which is analogous to the device 50 of FIGS. 1 to 6. In other words, these two inverter devices 250' and 250" are placed in series, unlike the devices 150₁ to 150₃ of FIG. 7, which are placed in parallel. This embodiment is advantageous insofar as it guarantees uniform distribution of the heating when the flow length is long, by implementing multiple inversions.

As appears from the above, the invention makes controlled heat delivery possible, which delivery can, in particular, be uniform, as regards both the central and peripheral streams of the flow of rubber. For this purpose, the number and/or the locations of the inverter devices, such as the inverter device 50 of FIG. 1 should be adjusted. It is also possible to adjust the operating conditions of the flow of rubber, namely, in particular its temperature, its pressure, and its flow rate, in order to adjust the quantity of heat generated upstream and downstream of the inverter device.

Another advantage of the invention lies in the fact that it makes it possible to increase the length of flow that is possible for the material. By using one or more inverter devices, it is possible not to degrade said material, even if it flows over a longer length.

Finally, since the or each inverter device is situated in the flow channel, i.e. in a zone in which the material does not set, it is possible to use said device a large number of times, or even to remove it in order to place it in another machine. This is to be compared with the prior solutions, in which the devices modifying the direction of flow of the material are placed in the mold proper.

Under such circumstances, such devices are necessary for each mold used in the same machine, thereby increasing the total cost of the operation. In addition, such devices give rise to a loss of material that has set during each molding cycle, thereby giving rise to additional costs.

The invention claimed is:

1. A method of working a rubber vulcanization machine wherein the machine includes means for plasticizing and injecting a rubber material in a fluid state to thereby create a flow of liquid material within a flow channel in which the material does not set in use, the flow channel having at least one outlet in communication with an internal volume of a mold in which the material is to set, the flow channel being provided with at least one inverter device for changing a flow path of the liquid material along the flow channel to thereby invert a radial temperature profile in the flow of the liquid material between an upstream zone and a downstream zone of the flow channel and wherein the at least one inverter device includes a plurality of first convergent channels for directing a first stream of the flow of liquid material from opposite peripheral sides of the upstream zone of the flow channel toward a center of the downstream zone of the flow channel and which first convergent channels have inlets facing the upstream zone of the flow channel and outlets facing toward the center of the downstream zone of the flow channel, and wherein the at least one inverter device also includes a plurality of second divergent channels for directing a second stream of the flow of liquid material from a center of the upstream zone of the flow channel toward the peripheral sides of the downstream zone of the flow channel and which second divergent channels have inlets facing the upstream zone of the flow channel and outlets diverging toward the opposite peripheral sides of the downstream zone of the flow channel, the method including the steps of:
  A. Causing the rubber material to flow through the flow channel and then, via the at least one outlet, into the internal volume of the mold, towards at least one cavity, and
  B. Adjusting a number and/or locations of the inverter devices and/or the operating conditions of flow of liquid rubber material to control the radial temperature profile of the material in order to invert the radial distribution of the temperature profile.

2. The method according to claim 1 wherein the radial temperature profile is uniform.

3. A rubber vulcanization machine for implementing the method of claim 1 including means for plasticizing and injecting a rubber material in a fluid state to thereby create a flow of liquid material within a flow channel in which the material does not set in use, the flow channel having at least one outlet in communication with an internal volume of a mold in which the material is to set, wherein the flow channel is provided with at least one inverter device for changing a flow path of the liquid material along the flow channel to thereby invert a radial temperature profile in the flow of the liquid material between an upstream zone and a downstream zone of the flow channel and wherein the at least one inverter device includes a plurality of first convergent channels for directing a first stream of the flow of liquid material from opposite peripheral sides of the upstream zone of the flow channel toward a center of the downstream zone of the flow channel and which first convergent channels have inlets facing the upstream zone of the flow channel and outlets that face toward the center of the downstream zone of the flow channel, and a plurality of second divergent channels for directing a second stream of the flow of liquid material from a center of the upstream zone of the flow channel toward the peripheral sides of the downstream zone of the flow channel and which second divergent channels have inlets that face the upstream zone of the flow channel and outlets diverging toward the opposite peripheral sides of the downstream zone of the flow channel.

4. A rubber vulcanization machine according to claim 3, wherein the at least one inverter device includes a body that is secured to walls of the flow channel.

5. A rubber vulcanization machine according to claim 4, wherein the plurality of divergent channels and the plurality of convergent channels are provided within the body.

6. A rubber vulcanization machine according to claim 4, wherein the body of the at least one inverter device is secured to the walls of the flow channel by being incorporated in a bore in the flow channel and being held stationary by a screw-on nozzle.

7. A rubber vulcanization machine according to claim 3, wherein, at any point of the at least one inverter device, a ratio between a sum of cross-sectional areas of the plurality of convergent and plurality of divergent channels and a total cross-sectional area of the flow channel is greater than 30%.

8. A rubber vulcanization machine according to claim 3, wherein up to ten convergent channels are provided and up to ten divergent channels are provided in the at least one inverter device.

9. A rubber vulcanization machine according to claim 3, wherein the flow channel subdivides into a plurality of branch channels, and at least one branch channel is provided with a corresponding inverter device.

10. A rubber vulcanization machine according to claim 3, wherein at least two inverter devices are provided, which devices are placed in series in the flow channel.

11. A rubber vulcanization machine according to claim 3, wherein, at any point of the at least one inverter device, a ratio between a sum of cross-sectional areas of the plurality of convergent and plurality of divergent channels and a total cross-sectional area of the flow channel is greater than 50%.

12. A rubber vulcanization machine according to claim 3, wherein four convergent channels and four divergent channels are provided in the at least one inverter device.

* * * * *